Aug. 10, 1954  L. J. PAGE  2,685,819

ADJUSTABLE OPHTHALMIC MOUNTING

Filed April 21, 1950

INVENTOR

Louis John Page

Patented Aug. 10, 1954

2,685,819

UNITED STATES PATENT OFFICE 2,685,819

ADJUSTABLE OPHTHALMIC MOUNTING

Louis John Page, Hollis, N. Y.

Application April 21, 1950, Serial No. 157,207

11 Claims. (Cl. 88—49)

1

This invention relates to improvements in an ophthalmic mounting having an adjustable bridge.

One of the principal objects of the invention is to provide an ophthalmic mounting having adjustable means which will allow the wearer of multiple focal lenses to quickly and easily adjust them to any number of vertical positions relative to the eyes.

Another object of this invention is to provide a bridge member which is removable and easy to work on.

Another object of this invention is to provide an adjustable bridge having a spring securing means which is simple, strong, and will function when accidently knocked out of alignment.

Another object of this invention is to provide a nose pad arm which positions the nose pad desirably relative to the bridge.

Another object of this invention is to provide a neat, attractive and inexpensive to manufacture adjustable mounting.

These and other objects and advantages will become apparent from the following description and from the accompanying drawing.

Referring to the drawing.

2

The fitting of multiple focal lenses has been troublesome, and in many cases they cannot be worn due to the occupational requirements, the inability of the wearer to adjust themselves, and other contributing factors.

This invention, therefore, is designed to overcome the above difficulties through the provision of the adjustable feature of the nose pads relative to the lenses.

Figure 1:
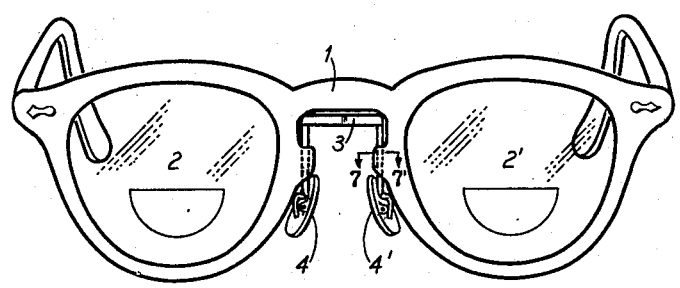
Figure 1 is a front elevation of an ophthalmic mounting embodying the invention.
Figure 2:
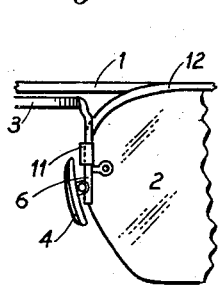
Figure 2 is an enlarged front elevation of the auxiliary nose piece shown in Figure 1, the nose pads and arms removed, the solid line figure showing the nose piece in its normal set, the dash lines showing it in a compressed set, the form it takes when mounted in the channel members of the mounting.
Figure 3:
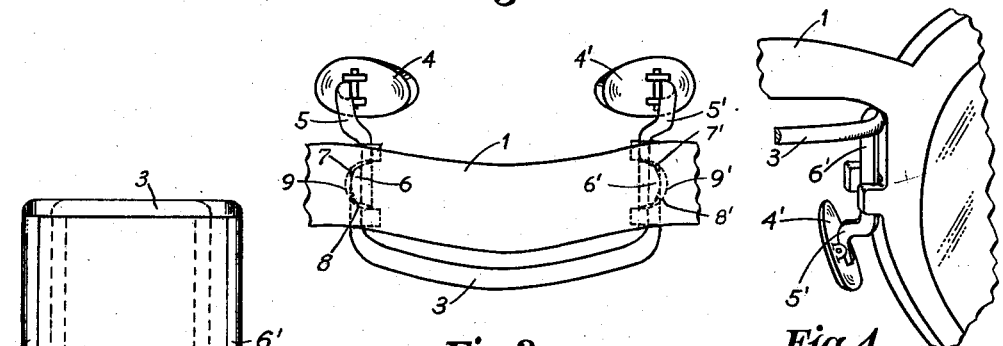
Figure 3 is a fragmentary plan view of the bridge showing the auxiliary nose piece in relation to the bridge.
Figure 4:
Figure 4 is a fragmentary front prospective view showing a member of the auxiliary nose piece in relation to the channel portion of the bridge shown in Figure 1.
Figures 5, 6:
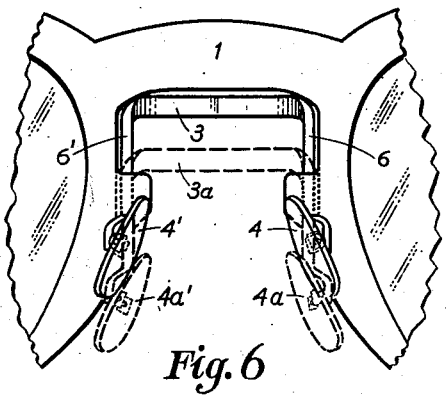
Figure 5 is a fragmentary rear elevation showing a modification of the invention.
Figure 6 is a fragmentary rear elevation on an enlarged scale of the bridge shown in Figure 1, showing the auxiliary nose piece in a raised position and the dash line showing it in a lowered position.
Figure 7:
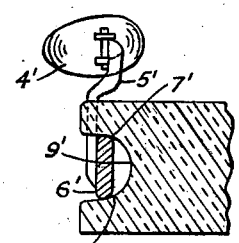
Figure 7 is a fragmentary sectional view taken on line 7—7' of Figure 1, showing the wedging engagement of the auxiliary nose piece in the channel members.

Referring to the drawing, like characters of reference designate like parts throughout the several views. In Figure 1 is shown a pair of lenses 2, 2' held by a frame embodying a preferred arrangement of the device in this invention. The bridge 1 connects the lens holding members and is an integral part thereof. The depending side portions of the bridge 1 have substantially vertically extending channels 9, 9' formed therein, as shown in Figures 3, 4 and 6. The walls of the channel members 9, 9' diverge horizontally towards the mouths thereof. The top edges of the walls of the channel members 9, 9' are spaced from the bottom surface of the bridge 1 as shown in Figures 1, 4 and 6. A resilient auxiliary nose piece is slideably mounted in the channel members 9, 9' for vertical travel. The auxiliary nose piece comprises a pair of spaced vertically extending side members 6, 6' connected at their upper ends by a forwardly extending spring crosspiece 3. A pair of nose pads 4, 4' are connected to the lower portion of the side members 6, 6' by the usual nose pad arms 5, 5'. It is to be particularly noted that the spring crosspiece 3 of the auxiliary nose piece extends forwardly of the bridge 1 as shown in Figure 3 and serves as a fingerpiece with which to manipulate the adjustment of the nose piece relative to the bridge. The preferred arrangement of the engagement of the side members 6, 6' of the auxiliary nose piece in the channel members 9, 9' is to have the side members 6, 6' of a larger cross sectional dimension than the base of the said channel members whereby each such side member within each channel member contacts the walls thereof along two spaced edges of such member to provide two point contact between the said side members and the walls of the said channel members to yieldably secure the said side members in wedging engagement with the walls of the said channel members. The two point contact is shown at 7, 8 and 7', 8' in Figure 3 and at 7' and 8' in Figure 7. The crosspiece 3 of the auxiliary nose piece is less curved in its normal set than when the nose piece is mounted in the channel members 9, 9'. The normal distance between the vertical side member 6, 6' is greater than the distance between the bases of the channel members. In Figure 2 is shown the relative positions of the side members 6, 6' of the auxiliary nose piece. The nose piece is shown in its normal set by the solid line figure and in a compressed state by the dash lines, the form it takes when it is mounted in the channel members 9, 9'.

In Figure 6 the auxiliary nose piece is shown in raised and lowered adjusted positions relative to the bridge 1 of the frame. The nose piece shown by the solid lines is shifted up until the crosspiece 3 contacts the lower edge of the bridge 1. In this adjustment the nose pads 4, 4' are raised relative to the lenses and the lenses will set lower before the eyes for distant viewing. The nose piece shown by the dash lines is shifted down until the crosspiece 3a contacts the top edges of the channel members 9, 9'. In this adjustment the nose pads 4a, 4a', are lowered relative to the lenses and the lenses will set higher before the eyes for near viewing. It is to be particularly noted that the lenses may be adjusted to any desired position between the lowered or raised positions shown and maintained at that desired position by spring friction induced by the spring action of the spring crosspiece 3. The auxiliary nose piece can be quickly and easily removed from the channel members 9, 9' and replaced by compressing the vertical side members 6, 6'. The spring action of the auxiliary nose piece can be regulated by increasing or decreasing the curve of the crosspiece 3.

The manipulation of the adjustment of the frame before the eyes is simple and accomplished with one hand. To raise the frame the thumb is placed under the right rim member and the middle finger is placed under the left rim member of the frame. The index finger is placed over the auxiliary nose piece. By pressing down the index finger while lifting the weight of the frame off the nose with the thumb and middle finger accomplishes the adjustment. To lower the frame the index finger is placed over the bridge and the thumb under the auxiliary nose piece. A squeezing action while lifting the weight of the frame off the nose accomplishes the adjustment.

Figure 8:
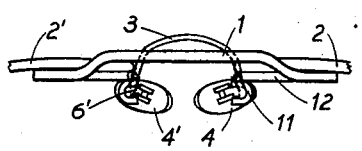
Figure 8 is a fragmentary plan view of the modification shown in Figure 5.

In Figures 5 and 8 is shown a modification of the invention applied to the semi-rimless type of ophthalmic mounting. The grooved or channel part 11 is attached to the rear of the arcuate arm 12 which supports the lens 2. The vertical member 6 of the auxiliary nose piece 3 slides in and is carried by the channel part 11. The function and manipulation of the device shown in Figures 5 and 8 are the same as described for the device shown in Figure 1.

From the foregoing description and accompanying drawing it is apparent that I have provided an ophthalmic mounting in accordance with the objects of this invention.

In the several views I have shown some preferred arrangements. It is understood that the channel members may be attached to the side members of the auxiliary nose piece and the depending side portions of the bridge or the side portions of the lens holding members have portions slidably mounted in these channel members on the auxiliary nose piece. I do not limit myself to these applications as this same principle may be applied to rimless mountings, rim type frames, combination metal and plastic frames. I do not limit myself to the particular design of bridges shown, as various other designs would permit operation in accordance with the principles set forth. I do not limit myself to the form of the channel member nor to the shape of the part carried by the channel member, nor to the particular engagement of these parts described, since any slidable arrangement will permit operation of the device in this invention. It is to be particularly noted that the bridge can be the resilient member and the auxiliary nose piece the rigid member. These and other modifications can be made without departing from the spirit of this invention.

I claim:

1. An ophthalmic mounting comprising a pair of lens holding members, means connecting said lens holding members, an auxiliary nose piece, said auxiliary nose piece comprising a pair of spaced vertically extending side members, means connecting said side members at their upper portions and nose pads connected to the lower portions of said side members, said lens holding members being provided with channel members, at least the top portion of the forward wall of each of said channel members being spaced below the bottom surface of said first mentioned connecting means, said side members being slidably mounted in said channel members for vertical travel, the means connecting said side members having portions extending forwardly of and below said first mentioned connecting means, whereby portions thereof overhang the top of the forward wall of each of said channel members, said auxiliary nose piece being releasably secured relative to said lens holding members in adjusted positions by the resilience of one of said means connecting one pair of said members and limited in vertical travel relative to said lens holding members upwardly when the top portion of the means connecting the side members of said auxiliary nose piece contacts the lower surface of the means connecting said lens holding members and downwardly when the portion of the means connecting the side members of said auxiliary nose piece which overhangs the forward wall of said channel members contacts the top portions of said forward channel walls, the means connecting the side members of said auxiliary nose piece serving as a fingerpiece to manipulate the vertical adjustment of said auxiliary nose piece relative to said lens holding members, the walls of said channels diverging horizontally towards the mouths thereof, at least a portion of that part of the side members mounted in said channels which enter said channels, having a larger cross-sectional dimension than the base of said channels whereby each such side member within said channels contacts the walls thereof along two spaced edges of such side member to provide two-point contact between said side members and walls of said channels to yieldably secure said side members in wedging engagement with said walls of said channels.

2. An ophthalmic mounting comprising a pair of lens holding members, means connecting said lens holding members, an auxiliary nose piece, said auxiliary nose piece comprising a pair of spaced side members, means connecting said side members at their upper portions and extending forwardly thereof, nose pads, said nose pads being connected to the lower portions of said side members, one pair of said members being provided with channel members, the top edges of the walls of said channel members being spaced below the bottom surface of each of said connecting means, the other pair of said members being slidably mounted in said channel members for vertical travel, and having portions thereof extending forwardly of and below said first mentioned connecting means, whereby said portions overhang the top of the forward wall of each of said channel members, said auxiliary nose piece being releasably secured relative to said lens holding members in adjusted positions by the resilience of one of said connecting means and limited in vertical travel relative to said lens holding members upwardly when portions of the means connecting said side members contacts the lower surface of the means connecting said lens holding members and downwardly when the overhanging portions of one pair of said members contacts the top of the forward wall of each of said channel members, the means connecting the side members of said auxiliary nose piece serving as a fingerpiece to manipulate the vertical adjustment of said auxiliary nose piece relative to said lens holding members, the walls of said channels diverging horizontally towards the mouths thereof, at least a portion of that part of the side members mounted in said channels which enter said channels, having a larger cross-sectional dimension than the base of said channels whereby each such side member within said channels contacts the walls thereof along two spaced edges of such side member to provide two-point contact between said side members and walls of said channels to yieldably secure said side members in wedging engagement with said walls of said channels.

3. An ophthalmic mounting comprising a pair of spaced rim members, a bridge connecting said members, an auxiliary nose piece comprising a top crosspiece, a pair of substantially vertical side members depending therefrom and nose pads connected to the lower portion of said side members, oppositely disposed portions of said bridge having substantially vertically extending channels, the vertical walls of said channels diverging horizontally towards the mouths thereof, the side members of said auxiliary nose piece being slidably mounted in said channels, at least a portion of that part of the side members carried by said channels, which enter said channels, having a larger cross-sectional dimension than the base of said channels, whereby each such side member within said channels contacts the walls thereof along two spaced edges of such member to provide two point contact between said side members and the walls of said channels to yieldably secure said side members in wedging engagement with said walls of said channels.

4. An ophthalmic mounting comprising a pair of lens holding members, means connecting said lens holding members, an auxiliary nose piece having a pair of side members, means connecting said side members, one pair of said members being provided with channels having forward and rearward diverging wall portions, the other pair of said members being positioned in said channel members and slideably carried and held therein by the resilience of the means connecting one pair of said members, at least a portion of that part of the member carried by said channels, which enters said channels, having a larger cross sectional dimension than the base of said channels, whereby each member within said channels contacts the walls thereof along two spaced portions of such member to provide two point contact between said members and walls of said channels to yieldably secure said members in wedging engagement with said walls of said channels.

5. An ophthalmic device for supporting multifocal lenses on the nose of a wearer so that they can be adjusted in a substantially vertical plane comprising: a pair of horizontally spaced lens supports; a bridge member connecting said lens supports and adapted to bridge the nose of a wearer; a pair of spaced open channel members arranged in confronting relationship beneath the bridge member and extending in a substantially vertical plane; and an auxiliary nose piece including a pair of substantially vertically extending side members having nose bearing pads attached to the lower portions thereof and an outwardly bowed generally U-shaped resilient cross piece extending between the upper ends of the side members and serving as a spring connection therebetween, the side members of said auxiliary nose piece being disposed in said channel members whereby the lens supports may be adjusted vertically relative to said auxiliary nose piece, the cross piece of said auxiliary nose piece being under partial compression so as to urge the side members into said channel members and into frictional engagement therewith and the bearing surfaces of said channel members being spaced a substantially equal distance apart throughout the length thereof so that the lens supports will remain in any adjusted position relative to said auxiliary nose piece and so that the nose bearing pads are held in substantially the same spaced relationship at any adjusted position, and said cross piece being subject to further compression whereby said vertically extending side members can be withdrawn from the channel members to permit the removal of said auxiliary nose piece, and the outer side wall of each of said channel members being shorter than the length of said side members and terminating a spaced distance beneath said bridge member and being disposed in the path of movement of the cross piece of the auxiliary nose piece to serve to limit the upward movement of the lens supports relative to the auxiliary nose piece, and the cross piece of said auxiliary nose piece being located beneath the bridge member and intersecting the vertical plane thereof at spaced points and projecting forwardly so that the rear surface thereof at the center of the bridge member is disposed in a vertical plane forward of the forward surface of the bridge member whereby the cross piece of said auxiliary nose piece serves as a finger grip for manipulating the adjustment of the lens supports relative to the auxiliary nose piece and the bridge member serves to limit the downward adjustment of the lens supports relative to the auxiliary nose piece.

6. An ophthalmic device for supporting multifocal lenses on the nose of a wearer so that they can be adjusted in a substantially vertical plane as set forth in claim 5 in which the crosspiece of the auxiliary nose piece is made of a spring material of substantially uniform cross-sectional size and shape throughout its length.

7. An ophthalmic device for supporting multifocal lenses on the nose of a wearer so that they can be adjusted in a substantially vertical plane as set forth in claim 5 in which the channel members are substantially shorter than the side members of the auxiliary nose piece.

8. An ophthalmic device for supporting multifocal lenses on the nose of a wearer so that they can be adjusted in a substantially vertical plane as set forth in claim 5 in which the side members of the auxiliary nose piece are substantially longer than the channel members and extend below the channel members in any adjusted position and the nose bearing pads are connected to and extend rearwardly from the lower ends of said side members whereby they can be adjusted without intreference with said channel members.

9. An ophthalmic device for supporting multifocal lenses on the nose of a wearer so that they can be adjusted in a substantially vertical plane as set forth in claim 5 in which the side members of the auxiliary nose piece are of greater cross-sectional size from front to rear of the mounting than in a sideways direction so as to provide greater lateral resiliency to prevent binding and so as to be less conspicuous.

10. An ophthalmic device for supporting multifocal lenses on the nose of a wearer so that they can be adjusted in a substantially vertical plane as set forth in claim 5 in which the depth of the channel members is greater than the thickness of the side members of the auxiliary nose piece and the sides of the channel members diverge from the base to the face thereof whereby the auxiliary side members contact the side walls of the channels along two spaced edges of the auxiliary side members to provide two-point contact therewith to yieldably secure said auxiliary nose embracing side members in wedging engagement with the channel members.

11. An ophthalmic device for supporting multifocal lenses on the nose of a wearer so that they can be adjusted in a substantially vertical plane as set forth in claim 5 in which the lens supports, bridge member, and channel members are integrally formed.

References Cited in the file of this patent
UNITED STATES PATENTS

| Number | Name | Date |
|---|---|---|
| Re. 20,732 | Yoo | May 17, 1938 |
| 1,102,909 | Hanna | July 7, 1914 |
| 2,104,063 | Whitney | Jan. 4, 1938 |
| 2,197,020 | Page | Apr. 16, 1940 |
| 2,277,726 | Splaine | Mar. 31, 1942 |
| 2,282,236 | Nerney | May 5, 1942 |
| 2,322,993 | Zell | June 29, 1943 |